Nov. 20, 1945.  W. A. PHILLIPS  2,389,238
COMPOSITE STRUCTURE AND STRUCTURAL ELEMENT
Filed Oct. 19, 1942  3 Sheets-Sheet 1
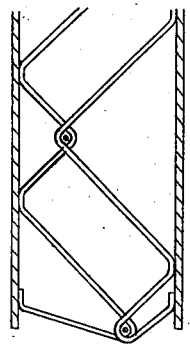
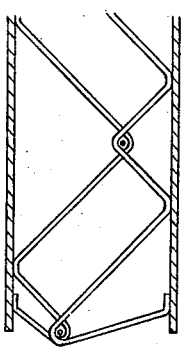
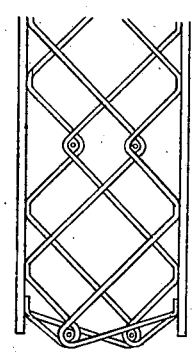
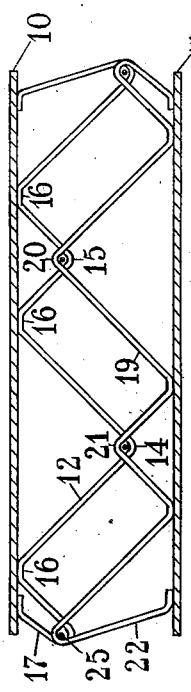
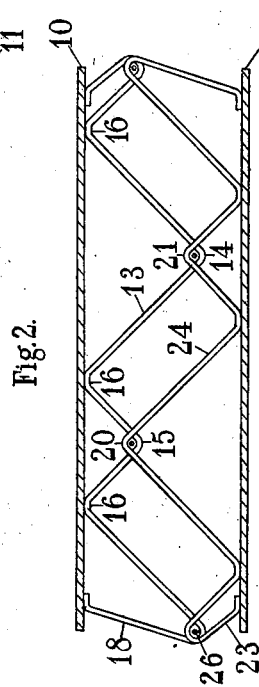
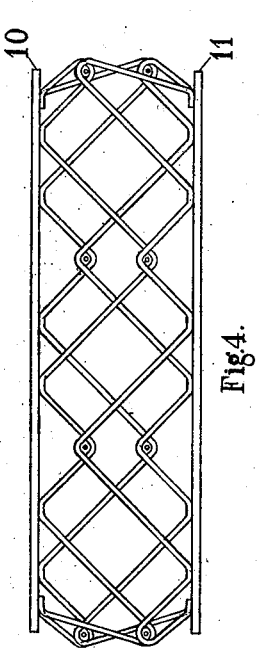
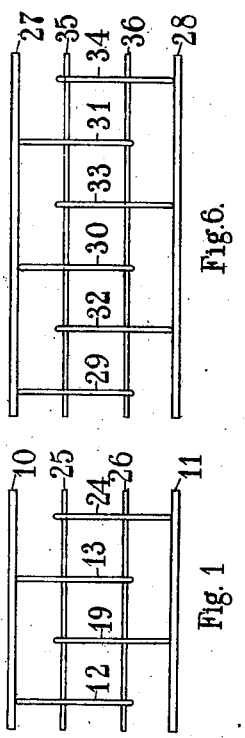
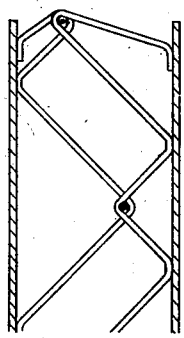
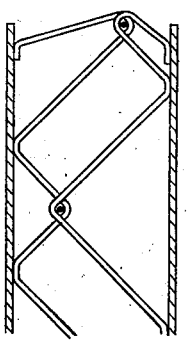
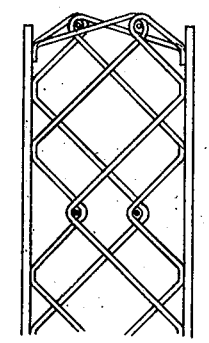
Inventor
W. A. Phillips
By Glascock Downing Seebold
attys.

Nov. 20, 1945.  W. A. PHILLIPS  2,389,238
COMPOSITE STRUCTURE AND STRUCTURAL ELEMENT
Filed Oct. 19, 1942  3 Sheets-Sheet 2
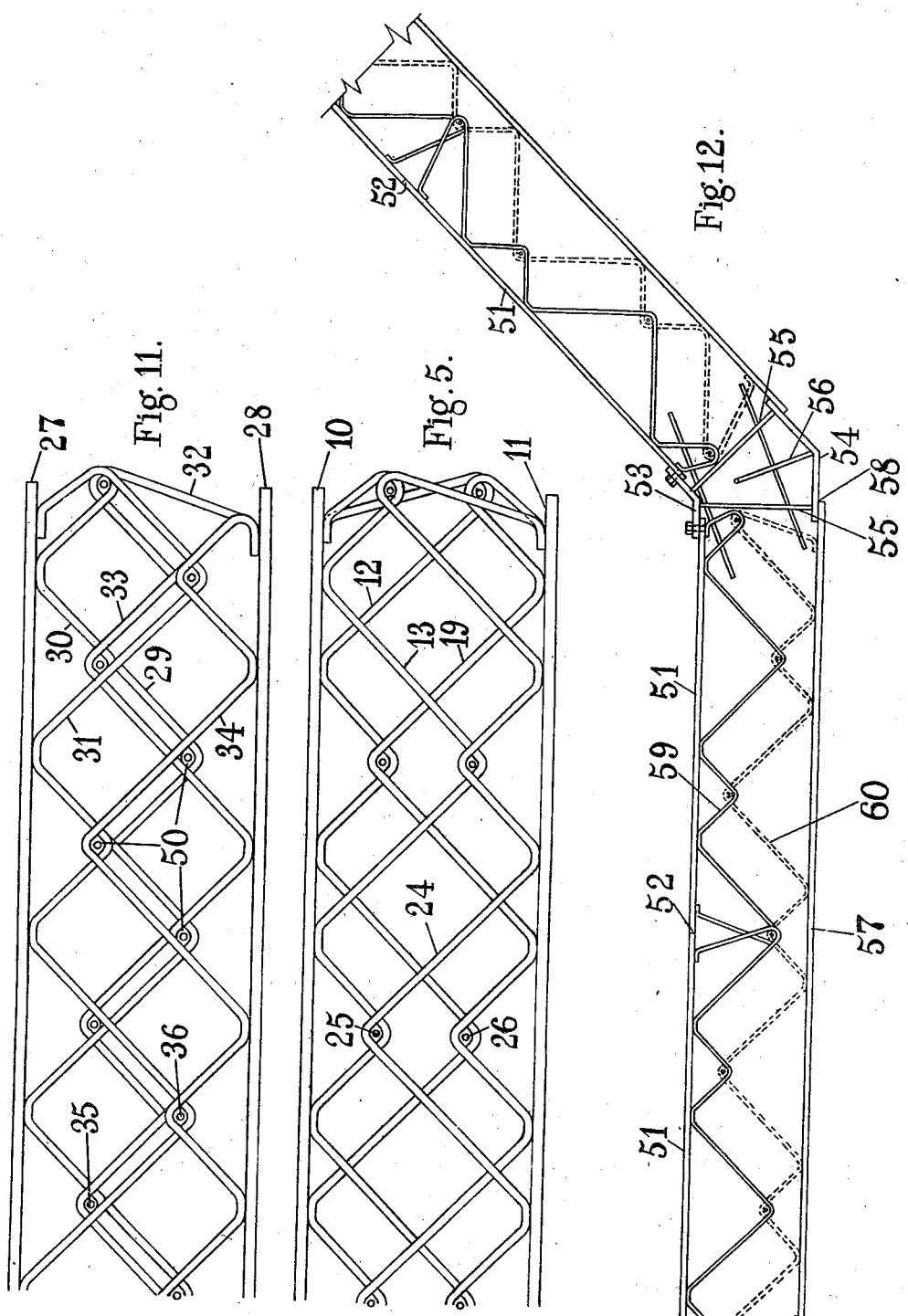

Nov. 20, 1945.  W. A. PHILLIPS  2,389,238
COMPOSITE STRUCTURE AND STRUCTURAL ELEMENT
Filed Oct. 19, 1942  3 Sheets-Sheet 3
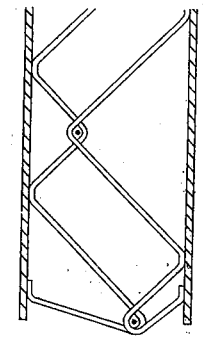
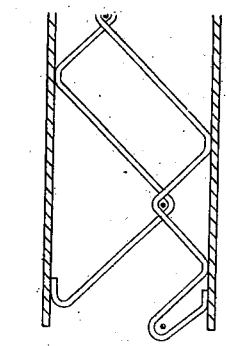
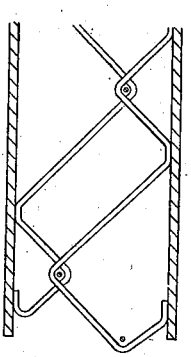
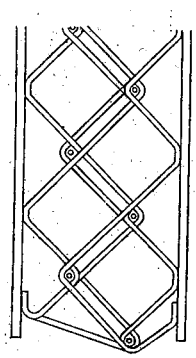
Fig.7.  Fig.8.  Fig.9.  Fig.10.
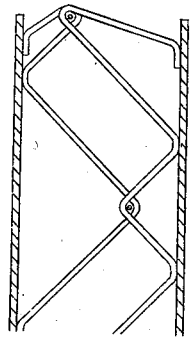
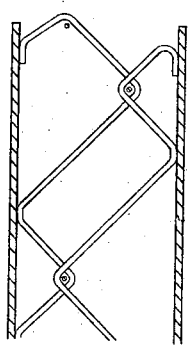
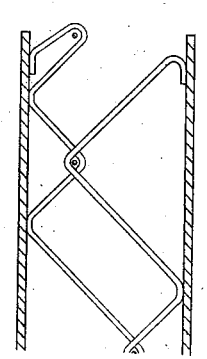
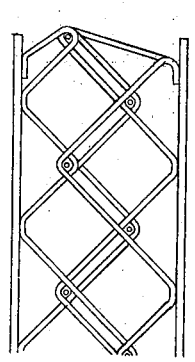
Inventor
W. A. Phillips
By Glascock Downing & Seebel
Attys Patented Nov. 20, 1945

2,389,238

UNITED STATES PATENT OFFICE 2,389,238

COMPOSITE STRUCTURE AND STRUCTURAL ELEMENT

William Arthur Phillips, London E. C. 4, England

Application October 19, 1942, Serial No. 462,570
In Great Britain December 20, 1940

5 Claims. (Cl. 72—110)

This invention relates to composite structures and structural elements and has for its main object to increase the strength of such structures and their resistance to penetration by projectiles or to the destructive effects of bombs and the like by relatively simple and inexpensive means. The invention is particularly adapted to afford such increased strength and resistance to steel structures or structural elements and especially fabricated structures or structures composed of steel plating.

Another object of the invention is to provide an improved method of building up a reinforced composite structure of the character described.

According to the invention, a structure or structural element comprises a superficial member which is integral with or secured to continuous reinforcing members in the form of rods or bars adapted to be embedded in concrete or other settable material, so that the said superficial member forms one side of a composite reinforced structure. The shape and disposition of the reinforcing members may be widely varied but in a preferred arrangement the rods are bent into a wavy or similar shape and crest portions thereof are united to the superficial member by welding. The reinforcing members are laid side by side and extend throughout the length of the element. Where the latter comprises a simple beam in which the length is many times the transverse dimensions the main reinforcing members may be disposed in the direction of the length of the beam only, but in larger elements such as slabs or in complete structures the reinforcing members may be disposed both longitudinally and transversely. Adjacent members may be so disposed longitudinally that the crest portions of such members are in staggered relationship.

According to a further feature of the invention the composite element or structure as previously defined may be provided with additional protection adapted to increase its resistance to penetration by projectiles or the like. Such protection may comprise applied plating, which may be light armour plating for example, secured to the side of the element opposite to the superficial member referred to previously. Such applied plating may be secured in position by bolts (preferably with countersunk heads) passing through the composition and secured by nuts hove up on the superficial member.

An alternative mode of strengthening the element, which may be employed either instead of or in addition to the applied plating, is by embedding a mesh or network of steel wire reinforcement in the concrete or the like. Either one or more layers of mesh may be employed, preferably so disposed as to best take tension in the element and so resist penetration by a bullet or shell fragment and disruption or disintegration of the element.

A further feature of the invention consists in employing the applied outer plating for a composite element as previously defined for the purpose of shuttering in the casting of the concrete or other settable filling material. This operation may be carried out for example by placing the superficial member with its integral reinforcement in a vertical position and then securing the lowermost outer plates in position by bolts. The concrete or the like is then poured up to or near the upper edge of the plating. A further line of plating is then secured in position and the pouring continued, the procedure being repeated until the plating is completed.

A structural element according to the present invention may be compared with the conventional reinforced concrete beam, the superficial member with its integral system of rods partaking of the conventional reinforcement which provides the tensile strength required. It will be appreciated that the invention provides an element which is less liable to be disintegrated by explosive impact and this advantage is largely due to the manner in which the concrete or like filler is held together by the superficial member and the reinforcement integral therewith. The effect will be enhanced by the additional plating or embedded mesh reinforcement previously described. The superficial member may, if desired, be duplicated so that such members enclose the composite element on two opposite sides, each member having an attached or integral reinforcing rod system and the two members being connected, if desired, by bolts or rods passing through co-operating crests and embedded in the intermediate concrete. Such a structural element when used as a beam or slab has the property of offering equal resistance to deflection by loads, e. g. at right-angles to the plating, irrespective of the direction of the load.

The system of reinforcing rods or equivalent elements should be dimensioned and disposed in accordance with generally understood principles. The rod members may be of any appropriate section. The settable material or binder may be concrete or any suitable composition of like character to concrete.

The superficial member which according to the invention essentially constitutes one side of the composite element may conveniently be a solid steel plate, or a series of connected plate sections, but may be perforated if desired, or again chequered plate or the like or rolled plate with serrations may be used, offering maximum association with the concrete.

The pre-fabricated reinforcing member according to the invention provides what may be termed a skin-stressed construction to the structure.

The invention may be applied to individual structural elements or to complete structures, e. g. to walls, floors, roofs, or to integral shells, land defence works or forts or gun emplacements and the like, and also to armoured vehicles, tanks, and to trains, omnibuses, ambulances and other vehicles, to pill boxes and defence posts, fixed forts in estuaries, air raid shelters, gun emplacements, anti-blast walls, well shafts, shaft sinkings (linings), ore and coal bunkers, chutes, conduits, sewers, dams, dock walls, silos, tanks, chimney stacks, strong rooms, armoured cavity walls (anti-concussion), partitions, floors, piles, pillars.

The accompanying drawings illustrate two forms of structural elements according to the invention and show the elements in position to function as shuttering for moulding the concrete or other settable material.

Figure 1 is an end section of a pair of structural elements in which each element is provided with a pair of reinforcing members or rods.

Figure 2 is a sectional plan taken on the line 2—2 of Figure 1.

Figure 3 is a sectional plan taken on the line 3—3 of Figure 1.

Figure 4 is a plan of Figure 1.

In Figures 2, 3 and 4, a number of elements are indicated showing the arrangement for connecting them together endwise.

Figure 5 is a plan showing a portion of a pair of elements in position on an enlarged scale.

Figure 6 is a plan of a modified arrangement in which each structural element is provided with three reinforcing rods.

Figure 7 is a sectional plan taken on line 7—7 of Figure 6.

Figure 8 is a sectional plan taken on line 8—8 of Figure 6.

Figure 9 is a sectional plan taken on line 9—9 of Figure 6.

Figure 10 is a plan according to Figure 6.

In each of Figures 7, 8, 9 and 10, three pairs of elements are indicated to show the mode of connecting them together end to end.

Figure 11 is a plan corresponding to a portion of Figure 10 on an enlarged scale.

Figure 12 is a plan view of a corner construction.

Referring to Figures 1 to 4 a pair of structural elements comprising plates 10, 11 is provided which are identical in construction, thus the plate 10 is provided with a pair of sinuous or wavy reinforcing rods 12, 13. These rods are bent or waved so that they have alternate high and low crests 14, 15 to one side, whereas the crests 16 on the other side are in alignment. The aligned crests are secured to the plate in any suitable manner as by welding thereto. At the ends of the wavy rods the crests 14, 15 are positioned beyond the ends of the plate and the rods are bent back at 17, 18 for attachment to the plate 10 by welding. The arrangement of the rods 13 as will be observed from Figure 3 is reversed so that in plan the crests are arranged in pairs, each pair comprises a crest 14 disposed at a greater distance from the plate 10 than the corresponding crest 15.

The plate 11 is provided with similarly sinuous or waved rods 19, 24 having high and low crests 20 and 21 the end crests being formed by inwardly directed portions 22, 23 (Figure 2) so that the end crests are disposed slightly beyond the ends of the plates. As in the case of the reinforcing rods 12, 13 of the plate 10 the rods 19, 24 of the plate 11 are reversed to provide pairs of crests disposed at different distances from the plate. When the plates are arranged in the operative position indicated in Figure 1, the reinforcing rods 12, 13 of plate 10 are located between the rods 19, 24 of plate 11 so that the pairs of crests in both plates are vertically aligned whereby vertical reinforcing rods 25, 26 may be passed through the overlapping crests.

With the parts in this position, wedges may be inserted to hold them at their proper distance so that the co-operating crests grip the rods 25, 26 and the concrete or other settable material may then be cast.

It will be appreciated from the plan, Figures 2, 3 and 4, that the end crests of each pair of elements project beyond the plates whereby adjacent elements may be coupled together by the vertical reinforcing rods 25, 26 extending through the interengaging crests of the adjacent elements, the distance that these crests project beyond the ends of the plates being such that when they are in the interengaging position, the plates abut one another.

It will be noted from Figure 1 that the rods 12, 13 of the plate 10 are arranged at the same distance from the top edge as the rods 24, 19 of the plate 11 are spaced from the lower edge so that each plate is a counterpart of the other and in practice one is merely reversed so that the sinuous or wavy rods are located in the correct position. It will also be noted that the corresponding rods 12, 13 and 19, 24 when the plates are opposed to one another, are uniformly distributed and spaced apart. They may, however, be so arranged that the rods 12, 19 and 13, 24 are in engagement with one another. With this form of the invention, the vertical reinforcing rods are evenly disposed in pairs.

In the form of the invention shown in Figures 6–11, each plate 27 and 28 is provided with three sinuous or wavy rods, namely 29, 30 and 31 on plate 27, and 32, 33 and 34 on plate 28. These waved rods are so arranged that the vertical rods 35, 36 which engage in the overlapping crests, extend in a uniform staggered arrangement along the space between the plates as will be seen from Figures 10 and 11.

The upper rod 29 of plate 27 is provided with high and low crests 37, 38 and crests 39 in alignment by which the rod is secured to the plate by welding. The end crests are formed by return portions 40, 41 of the rod, these crests being located beyond the end of the plates for securing to the next structural element.

The next lower rod 30 of the plate 27 is provided at one end with a pair of low crests 42, then a high crest 43 and a further end low crest 44, this rod being secured by welding by crests 45 which are in alignment. The end crest 42 which is formed by the returned portion 46 of the rod extends beyond the end of the plate for securing purposes but the crest 44 at the other end of the rod is located within the confines of the plate.

The lowest rod 31 of the plate 27 is provided with high and low crests 47 and 48 which are all located within the confines of the plate, and at one end is provided with a crest 49 which extends beyond the end of the plate to correspond with the crests 48 and 42.

The rod 32 of the plate 28, as will be observed from Figure 7, is complementary to the rod 29 of plate 27, so that it is reversed whereby the high and low crests in each rod co-operate with one another. The rod 30 of plate 27 corresponds in shape with the rod 34 of plate 28 except that it is reversed and similarly, the rod 31 of plate 27 corresponds in shape with the rod 33 of plate 28, except that it is reversed.

When the plates are assembled in the position shown in Figure 6, the various crest portions all co-operate to form a plurality of openings 50, Figure 10, arranged in uniform zig-zag manner to accommodate the vertical reinforcing bars 35, 36. The various reinforcing rods of the plates as will be noted in Figure 6 are spaced apart similarly to those indicated in Figure 1, but here again they may be arranged so as to engage one another in pairs. It will be noted from Figure 10 that each set of crests which extend beyond the plates, are disposed a third of the distance between the plates from plate 27 and at the other end a similar series of crests extend, one-third of the distance between the plates from the plate 28. These crests will interengage with corresponding crests on the next adjacent elements, so that they will all be connected up by the vertical reinforcing rods.

It will be appreciated that the vertical reinforcing rods will extend through the crests of a number of plate elements.

Where only a single row of vertical reinforcing rods is provided the crests on each plate will be of uniform height.

When applying the invention to the construction of standard structures such as pill boxes or defence posts it may be desirable to complete the assembly of the inside sheet metal facing of the structure independently of the outer facing, after which the outer facing plates are secured in position and the casting completed in stages. By this method of construction staggering of the joints as between the inner and outer facings may be obtained.

Referring now to Figure 12 which illustrates a convenient arrangement for the construction of the corners of a defence post for example, two inner plates 51 having a vertical joint 52 are provided for each wall. At the edges of the adjacent plates which form the corner they are bolted to the inner angle 53 of a corner element which has an outer angle 54 connected to the inner angle plate 53 by vertical zig-zag reinforcing rods 55. The corner elements may also have a zig-zag reinforcing rod 56.

The outer plate 57 of the wall may be of a dimension to conform to the pair of inner plates and at its edges 58 is adapted to engage on the outside of the outer angles 54 which thus form suitable distance pieces to hold the plates 57, 51 in correct position for casting the concrete. The plates 51 and 57 are provided with zig-zag reinforcing rods 59 and 60 secured thereto by welding, which rods may be arranged after the manner indicated in the earlier figures, it being appreciated of course, that the rod 60 associated with the plate 57 is of suitable shape to engage crests on the rod 59 of both plates 51.

In constructing a defense unit or pill box, it may be desirable to erect a light framework to act as a jig to which the inside plates 51 would be attached.

It will be appreciated that the angle between the two walls may vary as desired. Thus, where the angle between the walls is a right angle, the corner piece will have inner and outer angle plates of right angle form.

The plates used in the structural elements according to the invention would be of thin armour plating or of rolled chequered plates, the chequered side being in contact with the concrete. Where it is essential or desirable to provide a water tight facing the plates may be welded together at the joints.

By means of the invention, repairs to existing structures may be quickly and easily carried out by applying a suitable size plate or plates on the face of the damaged part and pumping concrete into the cavity. The reinforcing rods hold the plates in position and if necessary the plates may be welded in position.

I claim:

1. A structural element for use in reinforced concrete construction comprising a metallic plate, a plurality of elongated reinforcing rods secured thereto by welding, said rods being in spaced parallel relation and being of wavy form, the crests of one rod being staggered relatively to the crests on adjacent rods, said rods adapted to be embedded in the concrete and being formed at their ends with loops which extend beyond the edges of the plate, said loops adapted to cooperate with similar loops on an adjacent plate whereby the plates may be secured together end to end by reinforcing rods extending through said loops.

2. A structural element as claimed in claim 1, wherein the waves in each rod are in alignment on the side welded to the plate and are alternately high and low on the side remote from the plate.

3. A structural element for use in reinforced concrete construction comprising a metallic plate, elongated reinforcing rods of wavy form secured to said plate by welding at the crests of the rods, said rods being adapted to be embedded in the concrete and being formed at the ends with loops which extend beyond the edges of the plate, said loops being adapted to cooperate with similar loops on an adjacent plate whereby the plates may be secured together, end to end, by reinforcing rods extending through said loops.

4. A reinforced concrete construction comprising parallel series of facing metallic plates forming the outer surfaces of said construction, each series comprising a plurality of plates arranged end to end, each plate having elongated rods welded thereto which form a reinforcement for the concrete, each rod being formed at its ends in loops which extend beyond the edges of the plate and cooperate with similar loops of an adjacent plate, means for securing the cooperating loops to secure the plates together, the rods being of wavy form and the crests of the rods on opposed plates cooperating to provide locking apertures for rods extending therethrough to secure opposed plates together, and cementitious material filling the spaces between said plates.

5. A reinforced concrete construction comprising parallel series of facing metallic plates forming the outer surfaces of said construction, each series comprising a plurality of plates arranged end to end, each plate having elongated rods welded thereto which form a reinforcement for the concrete, each rod being formed at its ends in loops which extend beyond the edges of the plate and cooperate with similar loops on an adjacent plate, means for securing the cooperating loops to secure the plates endwise together, the rods being of wavy form and having crests in alignment at the side secured to the plates and alternately high and low crests on the side remote from the plates, the high and low crests of opposed plates cooperating to provide two rows of locking apertures to receive rods which lock the plates together, and cementitious material filling the spaces between said plates.

WILLIAM ARTHUR PHILLIPS.